(12) United States Patent
Pichler et al.

(10) Patent No.: US 11,023,797 B2
(45) Date of Patent: Jun. 1, 2021

(54) RFID TRANSPONDER AND METHOD OF OPERATING THE SAME

(71) Applicant: NXP B.V., Eindhoven (NL)

(72) Inventors: Thomas Pichler, Graz (AT); Christian Weidinger, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/872,952

(22) Filed: May 12, 2020

(65) Prior Publication Data

US 2020/0372313 A1    Nov. 26, 2020

(30) Foreign Application Priority Data

May 20, 2019  (EP) ..................................... 19175411

(51) Int. Cl.
*G06K 19/07*  (2006.01)
(52) U.S. Cl.
CPC ................................ *G06K 19/0701* (2013.01)
(58) Field of Classification Search
CPC .............. G06K 19/07; G06K 19/0701; G06K 19/07011; G06K 19/10128; G06K 19/10475; G06K 19/10237; G06K 19/10188
See application file for complete search history.

(56) References Cited

U.S. PATENT DOCUMENTS

| | | |
|---|---|---|
| 6,894,910 B1 | 5/2005 | Wu |
| 8,335,481 B2 | 12/2012 | Almgren |
| 2008/0136646 A1 | 6/2008 | Friedrich |
| 2009/0079571 A1 | 3/2009 | Calvarese |
| 2017/0017814 A1* | 1/2017 | Roberts .............. G06K 7/10128 |
| 2017/0179816 A1 | 6/2017 | Michal |
| 2018/0373905 A1 | 12/2018 | Gravelle et al. |

FOREIGN PATENT DOCUMENTS

| | | |
|---|---|---|
| FR | 2900752 A1 | 11/2007 |
| GB | 2406023 A | 3/2005 |
| WO | 2007/068974 A2 | 6/2007 |

* cited by examiner

*Primary Examiner* — Laura A Gudorf

(57) ABSTRACT

In accordance with a first aspect of the present disclosure, a radio frequency identification (RFID) transponder is provided, comprising a modulator and a modulator controller, wherein the modulator is configured to generate a modulated signal to be transmitted to an external RFID reader, and wherein the modulator controller is configured to control a duty cycle of the modulator in dependence on an available amount of power. In accordance with a second aspect of the present disclosure, a method of operating a radio frequency identification (RFID) transponder is conceived, comprising: generating, by a modulator of the RFID transponder, a modulated signal to be transmitted to an external RFID reader; controlling, by a modulator controller of the RFID transponder, a duty cycle of the modulator in dependence on an available amount of power.

14 Claims, 4 Drawing Sheets

200

202
Generating, by a modulator of an RFID transponder, a modulated signal to be transmitted to an external RFID reader 204
Controlling, by a modulator controller of the RFID transponder, a duty cycle of the modulator in dependence on an available amount of power

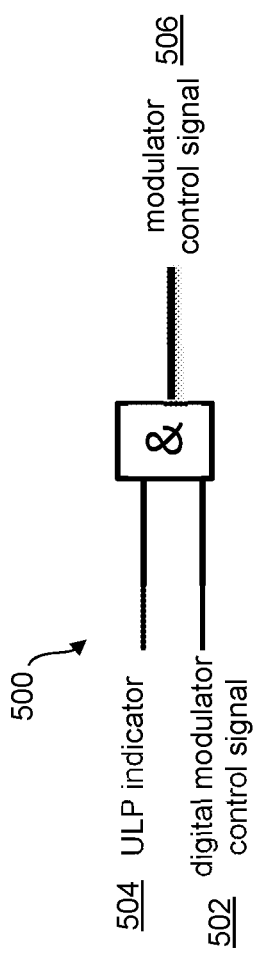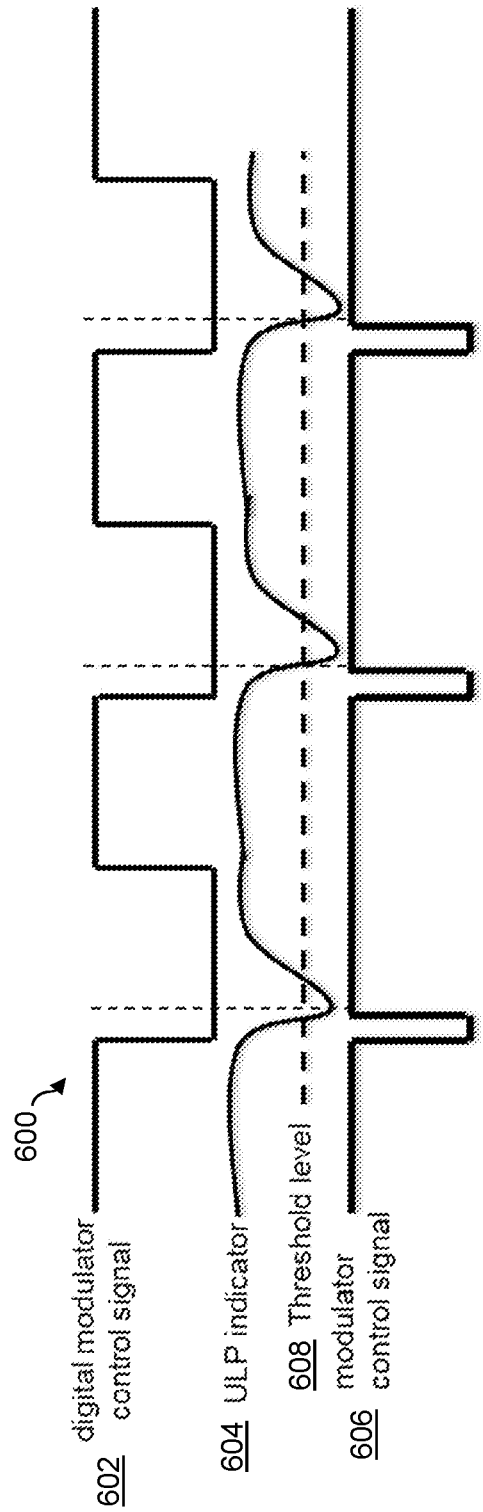
FIG. 5
FIG. 6

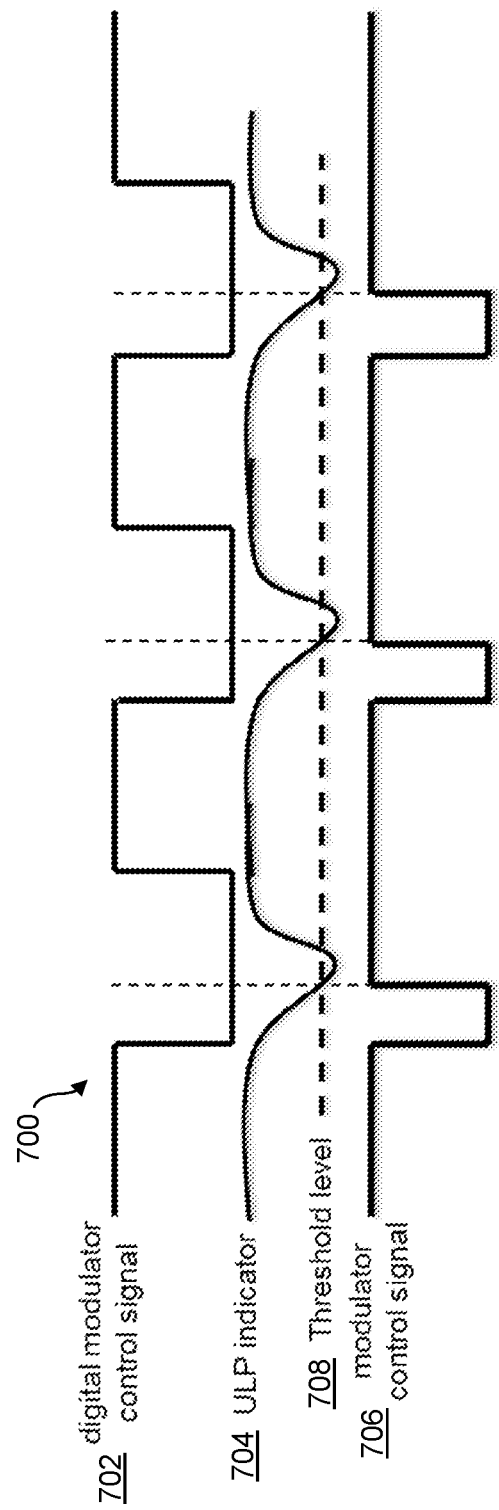

RFID TRANSPONDER AND METHOD OF OPERATING THE SAME

CROSS-REFERENCE TO RELATED APPLICATIONS

This application claims priority under 35 U.S.C. § 119 to European Patent Application No. 19175411.8, filed on May 20, 2019, the contents of which are incorporated by reference herein.

TECHNICAL FIELD

The present disclosure relates to a radio frequency identification (RFID) transponder. Furthermore, the present disclosure relates to a method of operating an RFID transponder.

BACKGROUND

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

SUMMARY

In accordance with a first aspect of the present disclosure, a radio frequency identification (RFID) transponder is provided, comprising a modulator and a modulator controller, wherein the modulator is configured to generate a modulated signal to be transmitted to an external RFID reader, and wherein the modulator controller is configured to control a duty cycle of the modulator in dependence on an available amount of power.

In an embodiment, the modulator controller is configured to receive a power signal indicative of the available amount of power and to use said power signal to control the duty cycle of the modulator.

In an embodiment, the modulator controller is further configured to generate a power-dependent control signal for the modulator using the power signal and a digital modulator control signal provided by a main controller of the RFID transponder.

In an embodiment, the modulator controller is configured to change the value of the power-dependent control signal if the value of the power signal falls below a predefined threshold.

In an embodiment, the digital modulator control signal defines a maximum possible duty cycle.

In an embodiment, the RFID transponder is an RFID tag.

In accordance with a second aspect of the present disclosure, a method of operating a radio frequency identification (RFID) transponder is conceived, comprising: generating, by a modulator of the RFID transponder, a modulated signal to be transmitted to an external RFID reader; controlling, by a modulator controller of the RFID transponder, a duty cycle of the modulator in dependence on an available amount of power.

In an embodiment, the modulator controller receives a power signal indicative of the available amount of power and uses said power signal to control the duty cycle of the modulator.

In an embodiment, the modulator controller generates a power-dependent control signal for the modulator using the power signal and a digital modulator control signal provided by a main controller of the RFID transponder.

In an embodiment, the modulator controller changes the value of the power-dependent control signal if the value of the power signal falls below a predefined threshold.

In an embodiment, the digital modulator control signal defines a maximum possible duty cycle.

In an embodiment, the RFID transponder is an RFID tag.

DESCRIPTION OF DRAWINGS

Embodiments will be described in more detail with reference to the appended drawings, in which:

FIG. 5 shows an illustrative embodiment of a modulator control signal generation;

FIG. 6 shows another illustrative embodiment of a controlled modulation;

FIG. 7 shows a further illustrative embodiment of a controlled modulation.

DESCRIPTION OF EMBODIMENTS

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

RFID communication may be based on inductive coupling. The communication between an RFID reader and an RFID transponder, such as an RFID tag, is often realized by means of load modulation and can be split into a forward link and a return link. More specifically, the RFID reader may transmit commands to the RFID transponder through a forward link, and the RFID transponder may transmit responses to those commands back to the RFID reader through a return link. The RFID transponder contains a modulator, which load modulates a carrier signal. Different types of load modulation exist, for example active load modulation (ALM) and passive load modulation (PLM). The control signal for controlling the modulator (i.e., for controlling the load change) typically has a constant, fixed duty cycle. However, a fixed duty cycle is either optimized for a low minimal field strength, or for a strong return link. A longer duty cycle results in less power available in the RFID transponder, but a stronger return link due to the higher system impact.

Now an RFID transponder and a corresponding method of operating an RFID transponder are disclosed, which facilitate achieving a strong return link while optimizing the power consumption during modulation.

Figure 1:
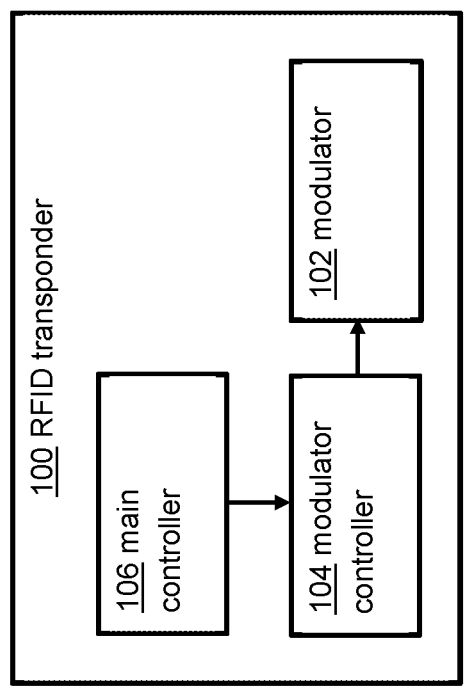
FIG. 1 shows an illustrative embodiment of an RFID transponder.

FIG. 1 shows an illustrative embodiment of an RFID transponder 100. The RFID transponder 100 comprises a modulator 102 operatively coupled to a modulator controller 104. Furthermore, the RFID transponder 100 comprises a main controller 106 operatively coupled to the modulator controller 104. The modulator 102 is configured to generate a modulated signal and to provide the modulated signal to a transmitter (not shown) of the RFID transponder, so that said transmitter can transmit the modulated signal to an external RFID reader. The modulated signal may for example be a load modulated signal, as described above. The modulator controller 104 is configured to control a duty cycle of the modulator 102 in dependence on an available amount of power. By controlling the duty cycle of the modulator 102 in dependence on an available amount of power, a strong return link can be achieved, while optimizing the power consumption during modulation. For example, if the available amount of power is low, the modulator may be switched off for long periods, without sacrificing on the quality of the return link altogether. On the other hand, if the available amount of power is high, the modulator may be switched on for long periods, thereby achieving a return link of maximum strength.

In an embodiment, the modulator controller 104 is configured to receive a power signal and to use said power signal to control the duty cycle of the modulator 102. In this way, the modulator controller 104 may easily control the duty cycle of the modulator 102. The term "power signal" refers to signal which is indicative of the available amount of power. In the examples described hereinbelow, the power signal is more specifically referred to as an ultra-low power (ULP) indicator. It is noted that the power signal may be a signal which is directly or indirectly indicative of the available amount of power. For example, the external radio frequency (RF) field generated by the RFID reader can be tracked and the field strength can be determined by a field strength determination unit of the RFID transponder. The field strength is indicative of the amount of power available to the RFID transponder. Alternatively, or in addition, the internal voltage level of the RFID transponder can be tracked. This voltage level is also indicative of the available amount of power. In another implementation, an indirect measure of the available amount of power may be used. For example, the RFID transponder may also comprise a voltage limiter. In that case, it may be determined whether the voltage limiter is active or not. This, in turn, may be a suitable indication of the available amount of power.

In an embodiment, the modulator controller 104 is further configured to generate a power-dependent control signal for the modulator 102 using the power signal and a digital modulator control signal provided by the main controller 106. The digital modulator control signal is typically a communication protocol-dependent signal. This further facilitates controlling the duty cycle of the modulator 102. The term "power-dependent control signal" refers to a control signal whose value can change in dependence on the amount of available power in the RFID transponder. In the examples described hereinbelow, the power-dependent control signal is also referred to as a "modulator control signal" in short, as distinguished from the digital modulator control signal.

In an embodiment, the modulator controller 104 is further configured to change the value of the power-dependent control signal if the value of the power signal falls below a predefined threshold. This further facilitates controlling the duty cycle of the modulator 102. More specifically, in this way, the modulation pulse can easily be cut off. Furthermore, the threshold may be configured according to the application of the RFID transponder, which results in an increased flexibility. In a practical and effective implementation, the digital modulator control signal defines a maximum possible duty cycle.

Figure 2:
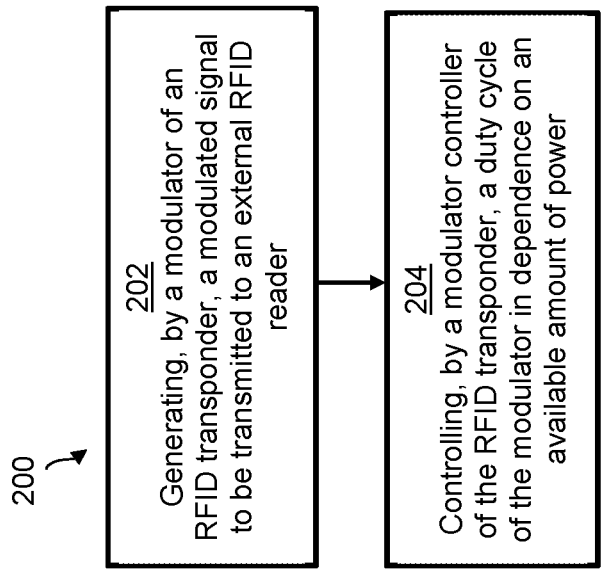
FIG. 2 shows an illustrative embodiment of a method of operating an RFID transponder.

FIG. 2 shows an illustrative embodiment of a corresponding method 200 of operating an RFID transponder of the kind set forth. The method 200 comprises, at 202, generating, by a modulator of the RFID transponder, a modulated signal to be transmitted to an external RFID reader, and at 204, controlling, by a modulator controller of the RFID transponder, a duty cycle of the modulator in dependence on an available amount of power. As mentioned above, by controlling 204 the duty cycle of the modulator in dependence on an available amount of power, a strong return link can be achieved, while optimizing the power consumption during modulation.

Figure 3:
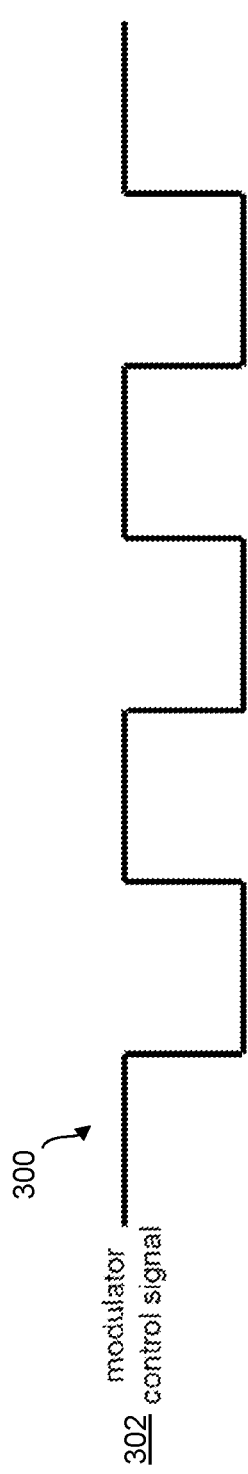
FIG. 3 shows an example of a controlled modulation.

FIG. 3 shows an example of a controlled modulation 300. In this example, the modulation is not controlled in dependence on the available amount of power in the RFID transponder. More specifically, the modulator control signal 302 (i.e., the control signal for controlling the modulator) has a constant, fixed duty cycle. As mentioned above, this has the disadvantage that a fixed duty cycle is either optimized for a low minimal field strength, or for a strong return link. In case it is optimized for a strong return link, the RFID transponder may quickly run out of power, for example when the strength of the radio frequency (RF) field generated by the RFID reader is low. In case it is optimized for minimal power consumption, the return link may be weak or not achieve its maximum possible strength. The presently disclosed RFID transponder and corresponding operating method facilitate achieving a strong return link while optimizing the power consumption during modulation.

Figure 4:
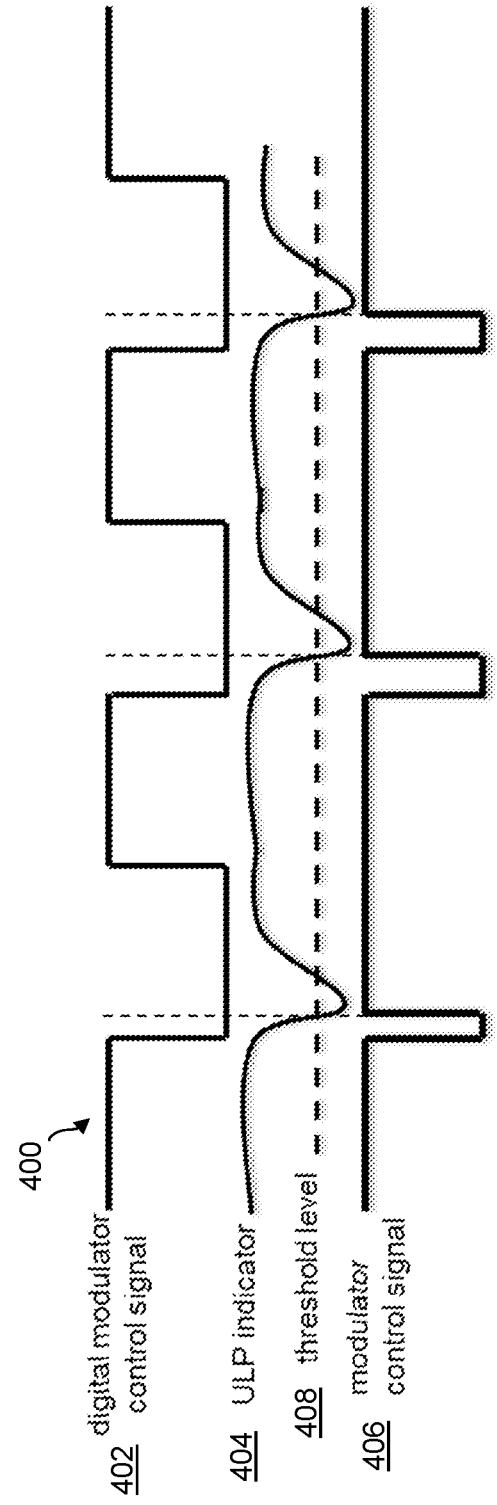
FIG. 4 shows an illustrative embodiment of a controlled modulation.

FIG. 4 shows an illustrative embodiment of a controlled modulation 400. The modulation of the RF field has an impact on the available energy in an RFID transponder. In particular if the transponder is a passive RFID tag, this impact may result in a significant decrease of performance. To achieve a strong return link, the modulator should be switched for long periods, which results in a high-power consumption. To achieve a good balance between the return link strength and the power consumption, the presently disclosed RFID transponder contains a modulator controller which is configured to control the duty cycle of the modulator in dependence on an available amount of power. In the example shown in FIG. 4, a power signal (i.e., the ultra-low power indicator 404) derived from the amplitude of the RF field generated by the RFID reader is indicative of the available amount of power. This power signal has a faster fall-time if the field strength, and thus the energy, is lower. For higher field strengths the power signal has a slower fall-time. The power signal may be used to control the duty cycle of the modulator. In particular, the modulator controller may be configured to generate a power-dependent control signal (i.e., the modulator control signal 406) using the ULP indicator 404 and a digital modulator control signal 402. More specifically, in the shown embodiment, the value of the modulator control signal 406 is changed if the value of the ULP indicator 404 falls below a predefined threshold level 408.

FIG. 5 shows an illustrative embodiment of a modulator control signal generation 500. As mentioned above, the modulator controller may generate a power-dependent control signal (i.e., the modulator control signal 506) for the modulator using the power signal (i.e., the ULP indicator 504) and a digital modulator control signal 506. For instance, the value of the modulator control signal 506 may be changed if the value of the ULP indicator 504 falls below a predefined threshold level. In this scenario, the modulator control signal 506 can have two values. More specifically, one value of the modulator control signal 506 triggers the modulator to perform load modulation while another value of the modulator control signal 506 triggers a switch-off of the modulator. In this example, an AND gate is used to combine the digital modulator control signal 502 and the ULP indicator 504. The skilled person will appreciate that other implementations are possible, for example implementations in which more complex logic is used to generate the modulator control signal 506. By changing the value of the modulator control signal 506 if the value of the ULP indicator 504 falls below the threshold level, the modulation pulse can effectively be cut off when the available amount of power drops below a critical level.

FIG. 6 shows another illustrative embodiment of a controlled modulation 600. In this embodiment, the modulator controller is again configured to generate a power-dependent control signal (i.e., the modulator control signal 606) using the ULP indicator 604 and a digital modulator control signal 602. More specifically, the value of the modulator control signal 606 is changed if the value of the ULP indicator 604 falls below a predefined threshold level 608. In this case, the strength of the RF field generated by the RFID reader is low, resulting in a fast fall-time of the ULP indicator 604. This, in turn, causes a rapid change of the modulator control signal 606 back to its original value, which results in a short modulation pulse. In this way, the power consumption of the modulator is kept within an acceptable limit.

FIG. 7 shows a further illustrative embodiment of a controlled modulation 700. In this embodiment, the modulator controller is again configured to generate a power-dependent control signal (i.e., the modulator control signal 706) using the ULP indicator 704 and a digital modulator control signal 702. More specifically, the value of the modulator control signal 706 is changed if the value of the ULP indicator 704 falls below a predefined threshold level 708. In this case, the strength of the RF field generated by the RFID reader is high, resulting in a slow fall-time of the ULP indicator 704. This, in turn, causes a slow change of the modulator control signal 706 back to its original value, which results in a long modulation pulse. In this way, a strong return link may be ensured, while still avoiding that the modulator consumes too much power.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID transponder
102 modulator
104 modulator controller
106 main controller
200 method of operating an RFID transponder
202 generating, by a modulator of the RFID transponder, a modulated signal to be transmitted to an external RFID transponder
204 controlling, by a modulator controller of the RFID transponder, a duty cycle of the modulator in dependence on an available amount of power
300 controlled modulation
302 modulator control signal
400 controlled modulation
402 digital modulator control signal
404 ULP indicator
406 modulator control signal
408 threshold level
500 modulator control signal generation
502 digital modulator control signal
504 ULP indicator
506 modulator control signal
600 controlled modulation
602 digital modulator control signal
604 ULP indicator
606 modulator control signal
608 threshold level
700 controlled modulation
702 digital modulator control signal
704 ULP indicator
706 modulator control signal
708 threshold level

The invention claimed is:

1. A radio frequency identification, RFID, transponder, comprising a modulator and a modulator controller, wherein:
   the modulator is configured to generate a modulated signal to be transmitted to an external RFID reader;
   the modulator controller is configured to control a duty cycle of the modulator in dependence on an available amount of power.

2. The RFID transponder of claim 1, wherein the modulator controller is configured to receive a power signal indicative of the available amount of power and to use said power signal to control the duty cycle of the modulator.

3. The RFID transponder of claim 2, wherein the modulator controller is further configured to generate a power-dependent control signal for the modulator using the power signal and a digital modulator control signal provided by a main controller of the RFID transponder.

4. The RFID transponder of claim 3, wherein the modulator controller is configured to change a value of the power-dependent control signal if the value of the power signal falls below a predefined threshold.

5. The RFID transponder of claim 3, wherein the digital modulator control signal defines a maximum possible duty cycle.

6. The RFID transponder of claim 1, being an RFID tag.

7. The RFID transponder of claim 1, wherein the available amount of power is indicated by an internal voltage level of the RFID transponder.

8. A method of operating a radio frequency identification, RFID, transponder, comprising:
generating, by a modulator of the RFID transponder, a modulated signal to be transmitted to an external RFID reader;
controlling, by a modulator controller of the RFID transponder, a duty cycle of the modulator in dependence on an available amount of power.

9. The method of claim 8, wherein the modulator controller receives a power signal indicative of the available amount of power and uses said power signal to control the duty cycle of the modulator.

10. The method of claim 9, wherein the modulator controller generates a power-dependent control signal for the modulator using the power signal and a digital modulator control signal provided by a main controller of the RFID transponder.

11. The method of claim 10, wherein the modulator controller changes a value of the power-dependent control signal if the value of the power signal falls below a predefined threshold.

12. The method of claim 10, wherein the digital modulator control signal defines a maximum possible duty cycle.

13. The method of claim 8, wherein the RFID transponder is an RFID tag.

14. The method of claim 8, wherein the method is implemented in instructions executable by a processor and stored in a non-transitory machine-readable medium.

* * * * *